Oct. 25, 1955   L. A. SAYCE   2,721,389
PRODUCTION OF RULINGS SUCH AS THOSE
OF DIFFRACTION GRATINGS
Filed April 16, 1952   5 Sheets-Sheet 4

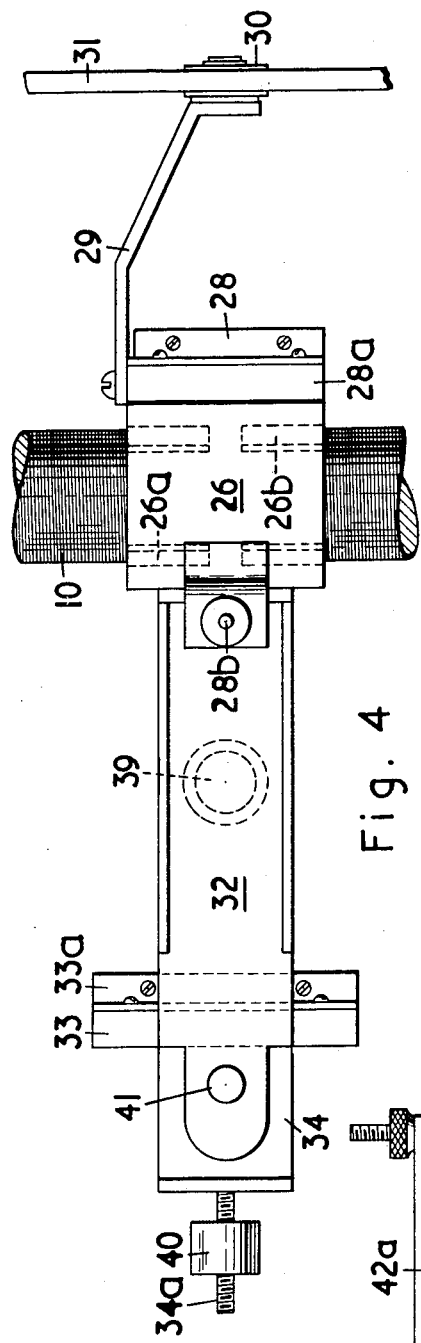
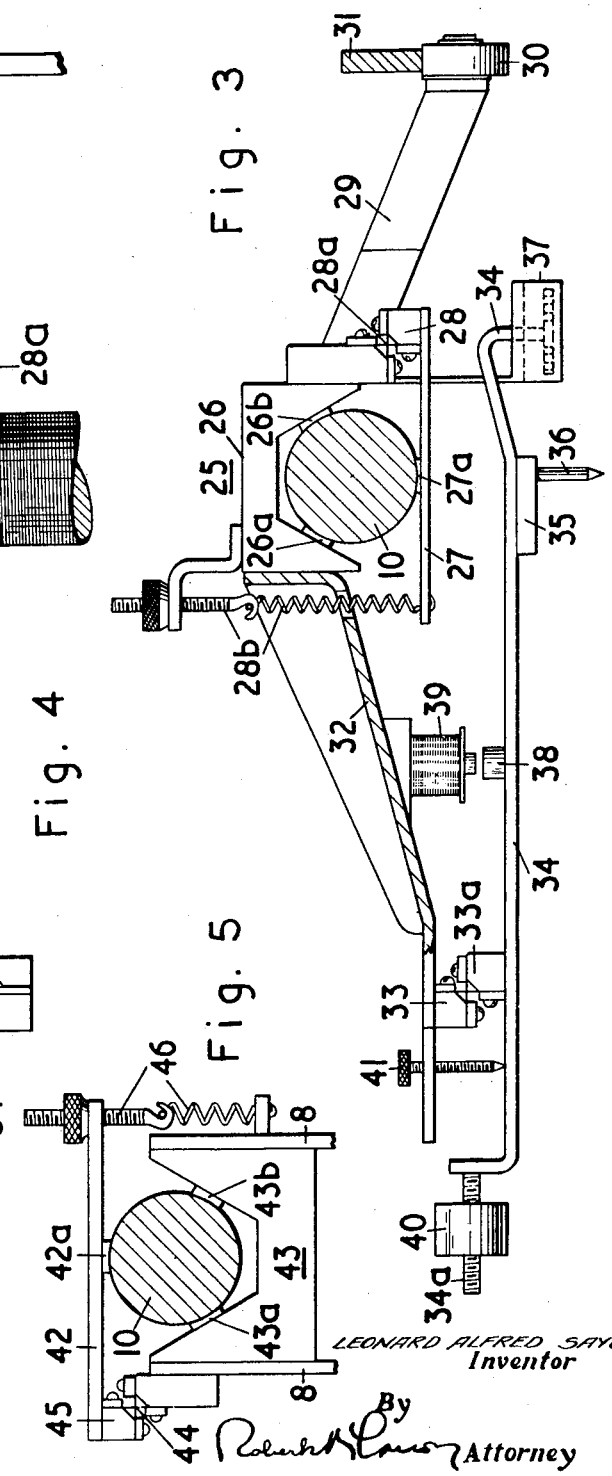

LEONARD ALFRED SAYCE,
Inventor
By
Robert H. Larson
Attorney

United States Patent Office 2,721,389
Patented Oct. 25, 1955

2,721,389

PRODUCTION OF RULINGS SUCH AS THOSE OF DIFFRACTION GRATINGS

Leonard Alfred Sayce, Hampton Hill, England, assignor to National Research Development Corporation, London, England, a British corporation Application April 16, 1952, Serial No. 282,731

Claims priority, application Great Britain April 16, 1951

5 Claims. (Cl. 33—32)

This invention relates to the ruling of diffraction gratings or the like and is concerned more especially with the production of rulings which take the form of a plurality of equally spaced parallel grooves or lines inscribed or ruled upon a surface by means of a tool such as a scribing tool.

In the ruling of diffraction gratings it has been customary hitherto for a large number of equally-spaced parallel grooves to be cut upon a flat or curved surface by means of a cutting tool. A well known method of accomplishing this is to reciprocate the surface by means of a carriage moving in one unvarying plane whilst during each cycle of reciprocation a cutting tool is advanced intermittently through small successive intervals in another plane prependicular to the first by means of a screw, means being provided for bringing the cutting tool into contact with the surface during one half only of the cycle of reciprocation. In this method it is customary to employ a screw having a pitch of, say, 30 threads to the inch to advance the tool and to produce a ruled surface having, say, 15,000 grooves to the inch. Thus the screw must be turned only 1/500 of a revolution between the cutting of successive grooves and this sub-division of the rotation of the screw is usually accomplished by furnishing it with a ratchet wheel having, in the case quoted, 500 equally spaced teeth.

Diffraction gratings produced by the method referred to above (or by the simple alternative in which the surface is advanced by a screw and the tool is caused to reciprocate over the surface) are liable to exhibit a number of defects. One such defect may be due to small periodic errors in the screw; another may be due to small inaccuracies in the sub-division of the ratchet wheel or its equivalent, whilst yet another defect may be caused by longitudinal movements of the screw arising from errors in its end-thrust bearing.

Now, it is an object of the present invention to provide for the production of rulings such as those of diffraction gratings in a particularly simple way which lends itself also to eliminating or minimising the various defects above referred to. To this end the invention resides primarily in that a pair of relatively movable co-operating elements, one being a ruling tool and the other a surface movable transversely with respect to the tool so that the latter can form rulings on the surface, are arranged in such a manner that one of said elements is caused to be continuously advanced with a uniform motion in one direction whilst simultaneously the other element is caused to execute reciprocatory movements in directions transverse to that of the uniformly moving element, the motion of the reciprocating element being controlled so as to enable the tool to inscribe or cut on said surface a succession of spaced parallel rulings each of which, within at least a given range linearly thereof, is in the form of a substantially straight line ruling.

Thus, instead of employing an intermittently rotatable relatively coarse screw for imparting an intermittent advance to the tool as has been adopted in the method hitherto customary, in carrying out the present invention according to one suitable arrangement the tool may be advanced with a uniform motion in one direction by means of a fine screw maintained in continuous rotation and having the same pitch as the required diffraction grating, or a multiple thereof, thereby providing for one complete revolution of the screw per cycle of reciprocation of the surface to be ruled. In consequence, the use of a ratchet wheel such as hereinbefore referred to (or its equivalent) is eliminated and, as a further consequence, a less stringent degree of synchronisation is required between the movement of the fine screw and the movement of the reciprocating surface whereby the screw and the surface can be driven by simple gearing or even by means of separate motors synchronised by well-known means. Since, in the arrangement contemplated, the fine screw traversing the cutting tool is maintained in continuous rotation, means are provided for ensuring that the motion of the reciprocating surface is substantially uniform during that portion of the cycle of operations in which the tool is in contact with the surface. In this connection it is to be observed that a reciprocating carriage for supporting the surface to be ruled should have its motion controlled so that, instead of executing a simple harmonic motion which would result in the ruling of a curved groove, it is caused to execute the desired uniform movement by means serving to produce a relatively high acceleration and deceleration at the beginning and end of its travel.

The cutting tool which is to be advanced with a uniform motion by means of the continuously rotating fine screw may be arranged so that it forms in effect a part of the follower or nut component of a nut and screw assembly such as has been disclosed by patent application No. 198,078, now Patent 2,702,393, issued February 22, 1955, according to which the thread portion of the said component is formed of an elastic material, for example cork, the elasticity of which is sufficient to ensure that whilst relative rotation of the screw and nut components can take place with comparative freedom an intimate contact is maintained between the interengaging threads of the components during such rotation, whereby such imperfections as periodic errors in the original formation of the male screw thread are averaged out owing to the elasticity of the elastic thread and irregularities in the resulting axial motion due to such errors are minimised. By adopting a motion transmitting mechanism of this character for imparting the uniform drive to the cutting tool according to the present invention the resulting rulings can be rendered substantially free from defects due to small periodic errors in the fine screw.

According to a further feature of the invention, means are arranged with a view to preventing undesired longitudinal movements of the fine screw. To this end the rod or cylinder carrying the thread of the screw may be mounted in at least one bearing which comprises a circumferentially complete, or interrupted, lining or insert of resilient material such as cork arranged to press upon a part of the rod or the like, which part is formed with a number of spaced parallel circumferential grooves into which the resilient material can engage with close conformity.

In order that the invention may be readily understood an embodiment thereof, as applied for the ruling of a diffraction grating of a character where a large number of equally spaced parallel grooves are ruled upon a flat plate by means of a diamond or like tool, is illustrated by way of example in the accompanying drawings, wherein:

Fig. 3 is a part-sectional view, on an enlarged scale, showing the mounting of a scribing tool as used in Fig. 1;

Fig. 4 is a plan of Fig. 3;

Fig. 5 shows, in cross elevation, details of an end bearing incorporated in Fig. 1;

Fig. 8 is a circuit diagram explanatory of part of the operation of the apparatus, while

Figure 1:
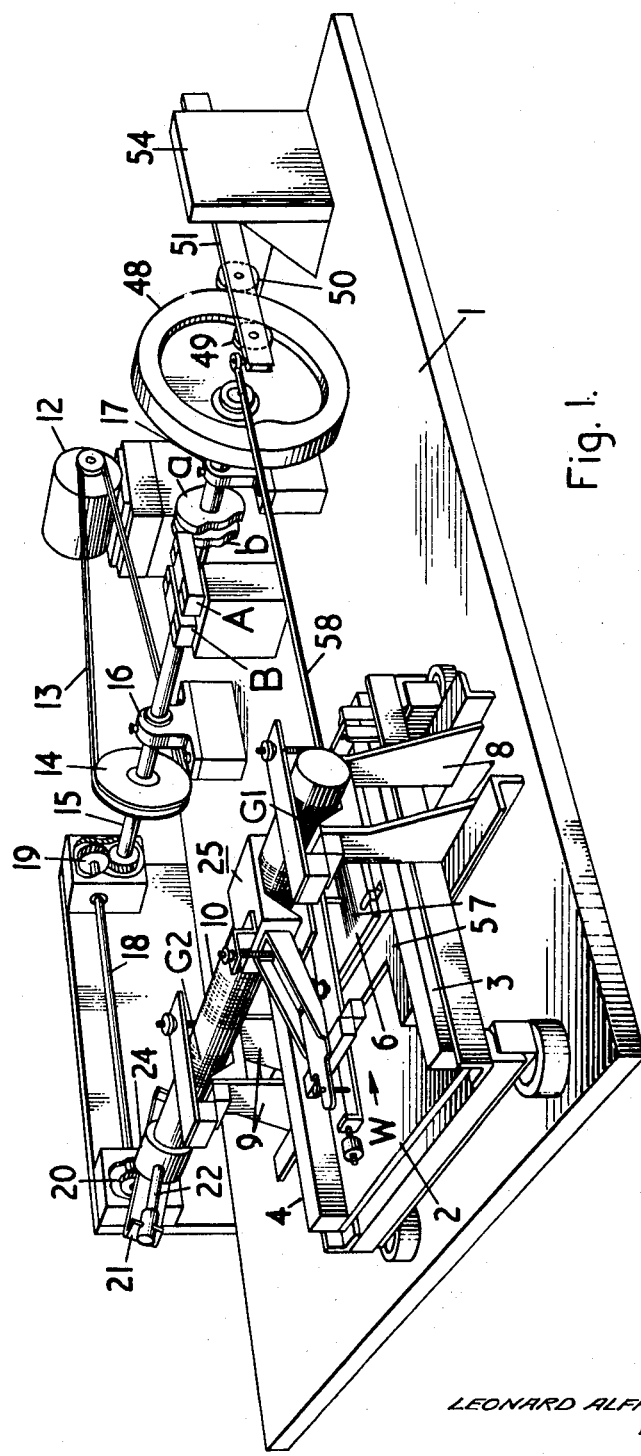
Fig. 1 shows in perspective the general arrangement of an apparatus embodying the invention.
Figure 2:
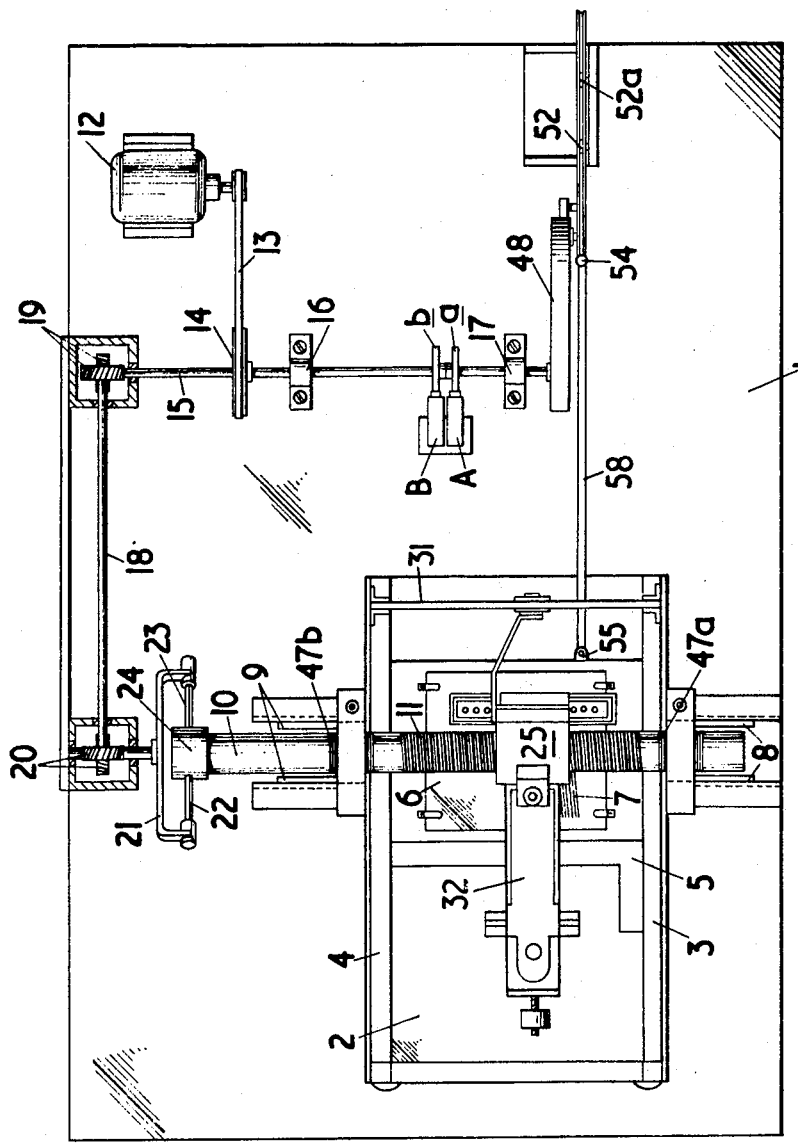
Fig. 2 is a plan of Fig. 1.

Referring now to these drawings, and firstly to Figs. 1 and 2, the numeral 1 designates a base on which a horizontal platform 2 is fixedly mounted at a level somewhat above that of the base. The platform 2 is formed with a pair of oppositely disposed parallel runner guides 3, 4 and serves as a support for a slidable carriage 5 which is capable of being reciprocated horizontally on the platform, in sliding relation with the guides 3, 4. Suitably clamped in a horizontal position on the carriage 5, so as to move therewith, is a flat plate 6. The plate 6 may be formed of glass the upper surface of which is metallised for receiving a succession of spaced parallel grooves, as at 7, so as to form a diffraction grating.

At opposite sides of the base 1, upwardly extending brackets 8, 9 provide supports for journalling horizontally at a suitable distance above the reciprocatory carriage 5 and plate 6 a rotatable cylindrical rod 10 extending at right angles to the direction of reciprocatory movement of the carriage 5 and therewith the plate 6. The cylindrical rod 10, e. g. of stainless steel, has formed thereon a fine screw thread 11 having a pitch, say, of the order of five thousand threads to the inch. The thread 11 extends along the rod 10 for a distance corresponding to at least, and conveniently somewhat more than, the distance between the first and last of the succession of parallel grooves 7 that are to be ruled on the plate 6. Furthermore, the thread 11 occupies a region of the rod 10 lying more or less fully over the width of the carriage 5 supporting the plate 6.

A continual rotation of the rod 10 and therewith the fine screw thread 11, during operation, is arranged to be imparted from an electric driving motor 12 arranged so that by means of a belt 13 passing over a pulley 14 which is fast with a transverse shaft 15 carried in bearings 16, 17, firstly the shaft 15 can be continuously rotated. Such rotation of the shaft 15 is caused to impart a continuous rotation to a longitudinally extending shaft 18 through spiral gearing 19, forming a connection between the shaft 15 and one end of the shaft 18, the other end of the shaft 18 being connected through similar spiral gearing 20 to a rotatable spider 21.

The spider 21 is equipped with pins 22, 23 holding a socket member 24 into which the one end of the cylindrical rod 10 can be received and held, whereby upon the continuous rotation of the spider 21 derived from the motor 12 as above described a continuous rotation is imparted to the rod 10. Moreover, with the mechanism described, the rod 10 is caused to rotate at the same speed as that of the shaft 15.

The fine screw thread 11, during rotation of the rod 10, is arranged to impart a unidirectional uniform motion to a diamond or like scribing device 25 adapted to be rendered effective upon the plate 6 during each of prescribed alternate strokes of reciprocation of the carriage 5. The desired uniform movement of the device 25 is obtained by mounting the same so as in effect to form part of a nut like component arranged to cooperate with the thread 11 in the manner of a follower nut. This component, as shown in Fig. 3, comprises upper and lower metal jaw members 26, 27 pivotally connected together at 28 by means of a suitable resilient cross-strip hinge mounting shown generally by 28a. The upper jaw member 26 is saddle shaped, whilst the lower jaw member 27 is of a flat plate construction. Spaced apart at substantially 120° on the underside of the arch that is formed by the saddle shaped upper jaw member 26 there are adhesively secured a pair of thin strip-like inserts or linings 26a, 26b of resilient material such as cork. A similar insert or lining 27a of resilient material is applied to the upper surface of the lower jaw member 27 at a position such that when the jaw members 26, 27 are clamped, by releasable spring tensioning means 28b, over a part of the fine screw portion of the rod 10 the sets of inserts 26a, 26b and 27a are mutually disposed at 120° around the rod 10 and, due to their resilience, become impressed by and conform to the threads of the screw which they engage. By arranging the resilient inserts 26a, 26b and 27a to extend over the screw thread 11 for a range of at least one complete cycle of a periodic error of the screw, the axial motion of the nut component 25, when the screw is rotating, is rendered free from reproducing such periodic error.

The nut forming component or device 25 is provided with an arm 29 extending outwardly and carrying at its end a roller 30 adapted to engage the underside of a stationary horizontal track bar 31, by which means the component is restrained from rotation whilst being capable of moving axially as a result of rotation of the rod 10 and the fine thread 11 thereon. Rigid with a part of the upper jaw member 26 is provided an outrigger arm 32 extending in a direction opposed to that of the arm 29. The arm 32, near its outer extremity, offers a fulcrum 33 formed by a suitable resilient cross-strip hinge mounting 33a which connects and ensures a limited vertically rocking movement of a tool arm 34 extending in one direction from the fulcrum towards a position underlying the nut assembly 25, yet somewhat above the plane of the reciprocatory plate 6, where it provides a holder 35 for maintaining a diamond tool 36 in a depending relation so as to make contact with the plate 6 by gravity action on the tool arm 34. Beyond the tool holder 35, the tool arm 34 terminates with a connection 34a to an oil dashpot 37. Between the tool holder 35 and the fulcrum 33 the tool arm 34 is equipped with an armature-forming member 38 capable of being attracted by an electromagnet 39 fitted to the outrigger arm 32 so that, when energisation of the electromagnet occurs, the tool arm 34 can be raised about its fulcrum 33, thereby causing the tool 36 to be lifted out of contact with the reciprocatory plate 6. The end of the tool arm 34 remote from the dashpot 37 is fitted with a suitable counterweight 40 the position of which is adjustable on the threaded portion 34a of the arm so as to determine, with the action of the dashpot 37, a suitable characteristic of operation of the arm. The initial setting of the tool arm 34 with respect to the outrigger arm 32 may be determined or varied by means of an adjustable setting screw 41.

For the journalling of the rod 10, near opposite ends thereof in the regions of the brackets 8 and 9, the one and the other system of brackets 8, 9 each supports a bearing having the construction shown in Fig. 5. As seen in this figure, as applied to the brackets 8, the bearing comprises a pair of upper and lower metal jaw members 42, 43 pivotally connected at 44 of a cross-strip hinge mounting 45. The jaw members 42, 43 are of a construction resembling that of which the nut assembly 25 is composed but wherein the lower jaw member 43, which is stationarily mounted, forms an inverted arch with a pair of thin strip-like inserts 43a, 43b of resilient material, such as cork, applied so as to engage at spaced regions around the lower part of the circumference of the rod 10. The upper jaw member 42 is of flat construction and has a similar insert 42a of resilient material applied to its underside so that when both jaw members 42, 43 are clamped, by releasable spring tensioning means 46, around the rod 10 the inserts 42a, 43a and 43b of resilient material engage the surface of the rod 10 where the latter is formed with a plurality of spaced parallel circumferential grooves as at G1 (Figs. 1 and 2) for example of the order of 500 to 1,000 to the inch, into which the engaging surfaces of the inserts, due to their resilience conform when clamping pressure is applied to the jaw members 42, 43, thereby preventing undesired longitudinal movements of the rod 10 during its rotation. Although, as shown in Figs. 1 and 2, a further series of spaced parallel grooves G2, having jaw members applied thereto the same as shown in Fig. 5, may be resorted to, it is to be understood that one or other of the sets of grooves G1, G2 may be omitted, in which event the same form of jaws assembly as has been illustrated in Fig. 5, with inserts of resilient material, may be adopted as merely a plain bearing where the omission of grooves G1 or G2 occurs.

Figure 6:
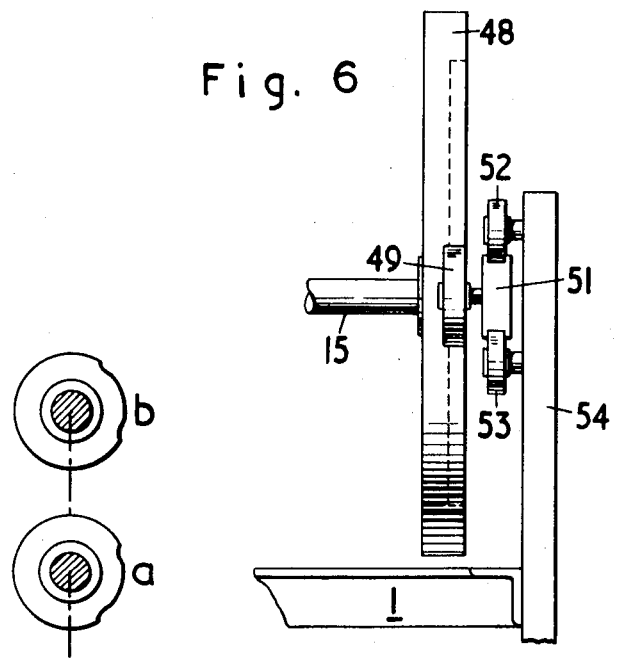
Fig. 6 is a fragmentary view, showing part of a cam and follower mechanism represented in Fig. 1.

For imparting the reciprocating movement to the carriage 5, the shaft 15 is fitted with an eccentrically mounted ring cam 48 shaped so as to engage with a pair of rollers 49, 50 acting as cam followers on a slide 51. The slide 51 is mounted between upper and lower rollers 52, 53 extending from a bracket 54 secured to the base 1 (Fig. 6), there being a further set of similar rollers as indicated at 52a in Fig. 2 to preserve rectilinearly guided movement of the slide 51. A rod 53, pivotally connected at 54a to one end of the slide 51 has its other end pivotally connected at 55 to the slidable carriage 5. Thus, as the cam 48 is rotated continuously by the shaft 15 the slide 51 undergoes a continual reciprocation which in turn imparts through the coupling rod 53 a continual reciprocation to the carriage 5 and therefore to the plate 6.

The shaft 15 also carries two further cams, a and b, arranged to actuate in proper phase (as hereinafter explained) respective switches A and B for operating the electromagnet 39 which raises the scribing tool 36 during the "return" stroke of the carriage 5. The direction of the "working" stroke, i. e. when the tool 36 is allowed to engage the plate 6, is indicated by the arrow W in Fig. 1.

Figure 7:
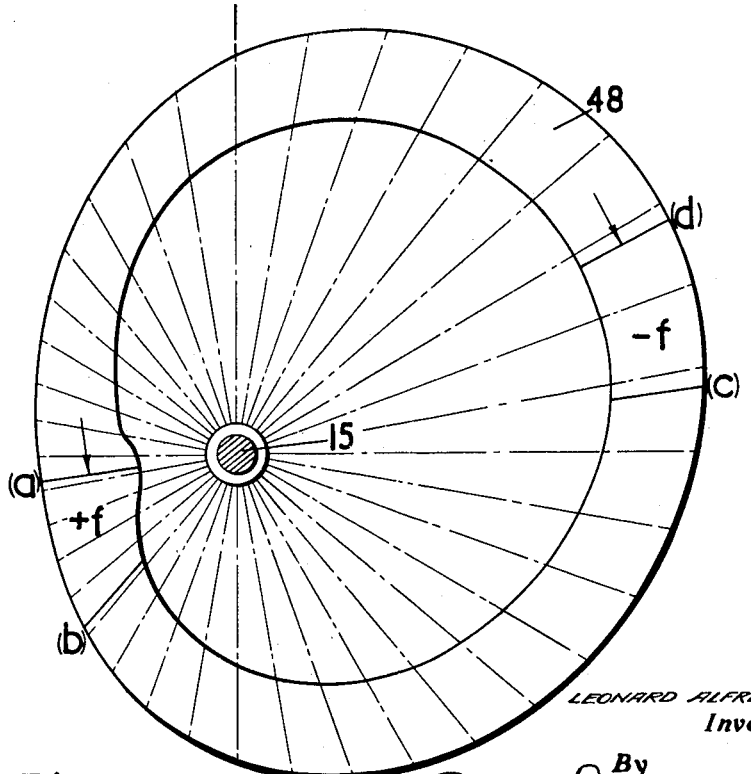
Fig. 7 is a view illustrating the contour of the cam shown in Figs. 1 and 6 and its relation to other parts of the mechanism.
Figure 8:
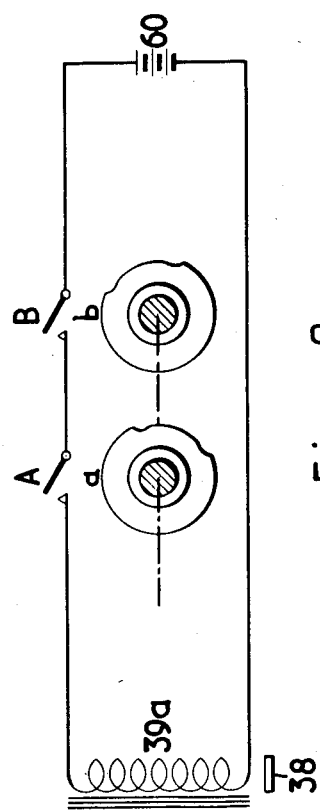
Figure 9:
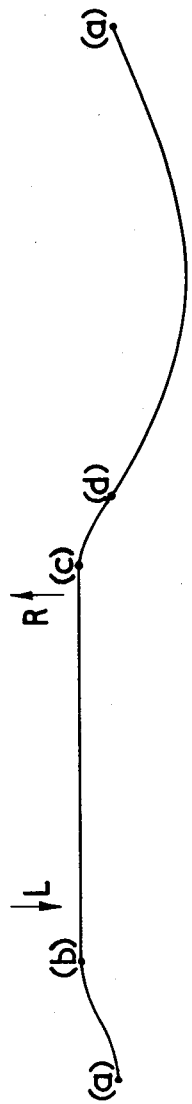
Fig. 9 is a curve demonstrating the principle of operation of the invention.

Referring now to Fig. 7, the contour of the cam 48 on the shaft 15 is such that from a point (a) to a point (b) giving rise to the "working" stroke of the tool 36, a relatively high acceleration +f is imparted to the carriage 5. From point (b) to point (c) the contour is such as to maintain a substantially uniform movement of the tool 36 whilst it is effecting the actual scribing of the plate 6. Point (c) to point (d) represents a contour portion ensuring a relatively high deceleration −f imparted to the carriage 5 after the scribing has been completed per each "working" stroke, whilst from point (d) to point (a) again the contour is such as to effect the "return" stroke in ordinary simple harmonic motion. The cams a and b which govern the raising and lowering of the tool 36 such that the tool is in engagement with the plate 6 only during that part of the "working" stroke wherein the motion of the cariage 5 is substantially uniform, are arranged to operate through the respective switches A and B (Fig. 1) according to the electric circuit indicated in Fig. 8. From this it will be seen that the circuit through the coil 39a of the electromagnet 39 (Fig. 3) from a source of energisation 60 includes the two switches A and B in series circuit relation. With both the switches A and B closed, the circuit through the coil 39a is completed with the result that the tool 36 is lifted clear from the plate 6. The opening of either one of the switches A and B by a corresponding one of the cams a and b interrupts the circuit whereupon the tool 36 is allowed to fall on to the plate 6 and effect the scribing thereon. The relative setting of the cams a and b depends, of course, on the extent to which the cam 48 is arranged to give a uniform motion of the carriage 5 during its "working" stroke. By way of further explanation, Fig. 9 is a curve showing the nature of one complete cycle of reciprocation according to the invention. Taking the points (a), (b), (c) and (d) on the cam 48 (see Fig. 7) it will be seen that the curve of motion of the carriage 5 as represented in Fig. 9 shows that from point (a) to point (b) a relatively high acceleration occurs. From point (b) to point (c) the flat portion of the curve represents the uniform motion during which the scribing tool is rendered effective, i. e. the tool is lowered at about the point indicated by the arrow L and is subsequently raised where indicated approximately by the arrow R. A relatively high deceleration then occurs between point (c) and point (d) whereafter from (d) to (a) again throughout the second half of the cycle the curve shows that the motion conforms substantially to a simple harmonic motion.

From the foregoing it will be seen that with the equipment in operation, the continual uniform rotation of the fine screw, rendered incapable of executing undesired longitudinal movements, causes the scribing tool to traverse uniformly in one direction across the plate while the latter alternately performs a "working" stroke and a "return" stroke. Each "working" stroke, which is effected when the electromagnet is de-energised, results in the execution of a straight line ruling over a major extent of travel, and the "return" stroke takes place with the electromagnet energised so as to lift the tool clear of the plate. As already indicated, the fine screw may have the same pitch as the required diffraction grating, or a multiple thereof, thus providing for one complete revolution per cycle of reciprocation.

If desired, the equipment may be readily modified so that the plate can be traversed uniformly by means of the screw and the controlled reciprocation imparted to the scribing tool.

What I claim is:

1. Apparatus for producing diffraction grating rulings or the like in the form of equally spaced parallel grooves or lines inscribed or ruled upon a surface by means of a tool such as a scribing tool, comprising a pair of relatively movable cooperating elements, one of said elements being the tool and the other of said elements providing a support for the surface on which rulings can be made by said tool, means for causing one of said elements to be continuously advanced with a uniform motion in one direction, means for causing the other of said elements to execute reciprocatory movements in directions transverse to that of said uniformly moving element whereby said tool is caused to form on said surface a succession of spaced parallel rulings, and means controlling the motion of said reciprocatory element during the course of its reciprocatory movements, said motion controlling means including means for imparting to said element a relatively high acceleration at the beginning of its travel in one direction, means for causing said element to move at a substantially uniform rate over a given further part of its travel in said direction, and means for imparting to said element a relatively high deceleration at the end of its travel in said direction, said motion controlling means thereby ensuring that each of said parallel rulings is, for a given linear extent thereof, in the form of a substantially straight line ruling.

2. Apparatus as set forth in claim 1, having means for rendering the tool at times effective and at times noneffective to form a ruling trace on said surface, said means having associated therewith a control means for causing the tool to be effective only during the period when said reciprocatory element is caused to move at said substantially uniform rate.

3. Apparatus for producing diffraction grating rulings or the like in the form of equally spaced parallel grooves or line inscribed or ruled upon a surface by means of a tool such as a scribing tool, comprising a pair of relatively movable cooperating elements, one of said elements being the tool and the other of said elements providing a support for the surface on which rulings can be made by said tool, means for causing one of said elements to be continually advanced with a uniform motion in one direction, said means including a screw having thereon a fine thread possessing periodic errors in the turns of said thread, means for continuously rotating said screw, a nut engaging said screw and means causing said one element to advance continually in response to relative axial motion produced between said nut and said screw when relative rotation between said screw and said nut occurs, said nut having the thread portion thereof formed of an elastic resilient material engaging a plurality of said turns of said thread extending over a range of at least one complete cycle of periodic error of said screw whereby during said relative rotation the imperfections in the form of periodic errors in the original formation of said fine thread are averaged out owing to the elasticity of said elastic thread, means for causing the other of said elements to execute reciprocatory movements in directions transverse to that of said uniformly moving element whereby said tool is caused to form on said surface a succession of spaced parallel rulings, and means controlling the motion of said reciprocatory element during the course of its reciprocatory movements, said motion controlling means including means for imparting to said element a relatively high acceleration at the beginning of its travel in one direction, means for causing said element to move at a substantially uniform rate over a given further part of its travel in said direction, and means for imparting to said element a relatively high deceleration at the end of its travel in said direction, said motion controlling means thereby ensuring that each of said parallel rulings is, for a given linear extent thereof, in the form of a substantially straight line ruling.

4. Apparatus as set forth in claim 1, wherein the means for causing said other of said elements to execute reciprocatory movements comprises a cam, a linkage interconnecting said cam and said reciprocatory element, means for rotating said cam to cause said linkage to impart to said element one complete cycle of reciprocation per one complete revolution of said cam, and said motion controlling means includes contouring on said cam to cause said linkage to impart to said element a relatively high acceleration at the beginning of its travel in one direction, a further contouring on said cam to cause said linkage to impart to said element for a given extent of its travel a uniform velocity, and a still further contouring on said cam to cause said linkage to impart to said element a relatively high deceleration at the end of its travel in said direction.

5. In a ruling apparatus having a reciprocatory element for supporting a surface to be ruled and a fine screw possessing periodic errors in the turns of the thread thereof and journalled for rotation about an axis transverse to the direction of motion of said element, a nut engaging said screw and having the thread portion thereof formed of an elastic resilient material engaging a plurality of said turns of said thread extending over a range of at least one complete cycle of periodic error of said screw, a tool carried by said nut, means for continuously rotating said screw in a direction to cause said tool to be advanced with a uniform motion in one direction, a cam, a linkage interconnecting said cam and said reciprocatory element, and means for rotating said cam to cause said linkage to impart to said element one complete cycle of reciprocation per one complete revolution of said cam, and means controlling the reciprocating motion of said element including a contouring on said cam to cause said linkage to impart to said element a relatively high acceleration at the beginning of its travel in one direction, a further contouring on said cam to cause said linkage to move said element at a substantially uniform rate over a major part of its travel in said direction, and still further contouring on said cam for causing said linkage to impart to said element a relatively high deceleration at the end of its travel in said direction, and means for raising and lowering said tool with respect to said surface, and switching means controlling said raising and lowering means whereby said tool is allowed to be in engagement with said surface only during the period when said linkage moves said element at the substantially uniform rate over said major part of its travel.

References Cited in the file of this patent

UNITED STATES PATENTS

| 586,669 | Shedlock | July 20, 1897 |
| 1,558,513 | Souder | Oct. 27, 1925 |
| 2,575,367 | Strong | Nov. 20, 1951 |

FOREIGN PATENTS

| 708,130 | France | Apr. 27, 1931 |